Dec. 22, 1964   A. A. POLI, JR., ETAL   3,162,217
HYPODERMIC SYRINGE
Filed Sept. 25, 1962   2 Sheets-Sheet 1
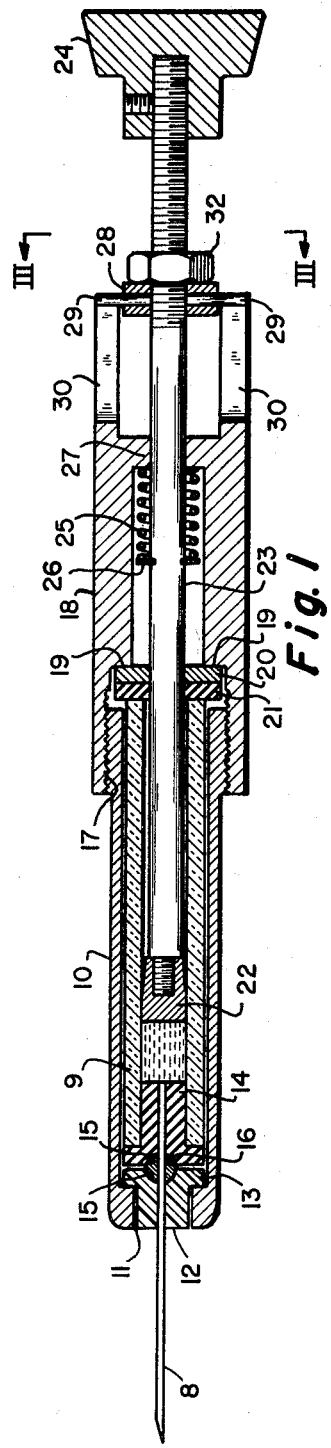
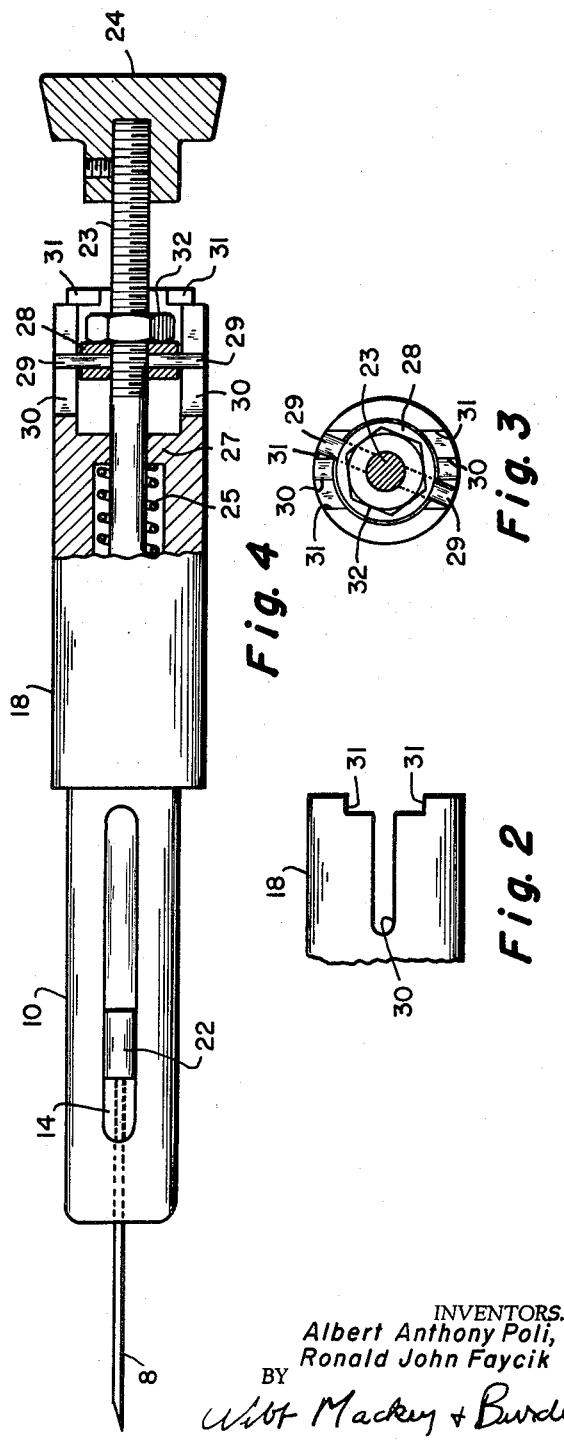
INVENTORS.
Albert Anthony Poli, Jr.
Ronald John Faycik
BY
THEIR ATTORNEYS Dec. 22, 1964    A. A. POLI, JR., ETAL    3,162,217
HYPODERMIC SYRINGE
Filed Sept. 25, 1962    2 Sheets-Sheet 2
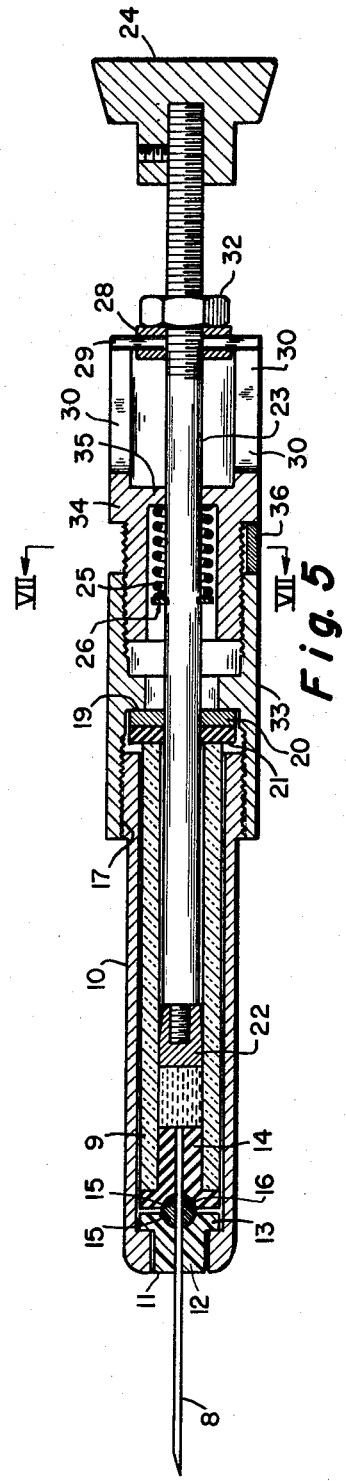
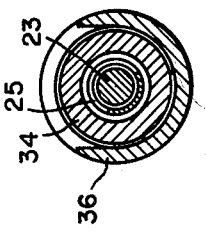
INVENTORS.
Albert Anthony Poli, Jr.
Ronald John Faycik
BY
*Witt Mackey & Burden*
THEIR ATTORNEYS __United States Patent Office__ 3,162,217
Patented Dec. 22, 1964

3,162,217
HYPODERMIC SYRINGE
Albert Anthony Poli, Jr., Pittsburgh, and Ronald John Faycik, Johnstown, Pa., assignors to Fisher Scientific Company, Pittsburgh, Pa.
Filed Sept. 25, 1962, Ser. No. 226,086
3 Claims. (Cl. 141—27)

This application relates to a hypodermic syringe, more particularly a hypodermic syringe used in conducting analyses by gas chromatography.

In carrying out analyses by gas chromatography, a stream of inert carrier gas is caused to flow through one or more chromatographic columns and through thermal conductivity cells positioned at the exit end of each column. A sample of the mixture to be analyzed is injected into the carrier stream in advance of the first column. As the sample passes through the column or columns, the mixture is separated into its several components, which components elute one at a time from a column and are detected by a thermal conductivity cell which in turn sends a signal to a reading or recording device. In order to obtain accurate and reproduceable results by this method of analysis, it is important that samples of uniform volume be injected into the carrier stream, and it is also important that the sample be injected into the carrier stream at a uniform rate.

Generally, samples analyzed by gas chromatography are relatively small, and are injected into a carrier stream by means of a hypodermic syringe inserted through a rubber serum cap. It requires considerable skill on the part of an operator using a hypodermic syringe to repeatedly insert samples at a uniform rate and of uniform volume. We have invented a hypodermic syringe whereby these results can readily be obtained without prior practice or training.

The hypodermic syringe which we have invented is generally similar to conventional syringes having a glass tube, a needle at one end of the tube, and a plunger which can be moved within the tube towards and away from the needle to move liquids or gases in and out of the tube through the needle. The plunger is mounted on a plunger rod which carries a hand knob at its outer end so that the operator can move the plunger in the glass tube.

In our syringe, we also provide a compression spring which engages the rod and presses the plunger against the end of the needle within the glass tube. When the plunger is moved away from the end of the needle to draw liquid or gas into the tube, the spring is compressed and upon release of the plunger rod, the spring will move the plunger towards the needle to eject liquid or gas from the tube.

We also provide means for releasably holding the plunger rod against the force of the spring when the plunger is moved from the needle. The holding means can be adjusted so that the amount of liquid or gas expelled by the plunger upon release of the rod can be adjusted. The plunger can readily be brought back to the same holding position repeatedly so that upon release of the plunger samples of uniform quantity will be ejected at a uniform rate.

In the accompanying drawings, we have illustrated certain presently preferred embodiments of our invention in which:

FIGURE 1 is a longitudinal section of one form of our syringe showing the plunger withdrawn;

FIGURE 2 is a partial side view of a part of the syringe shown in FIGURE 1;

FIGURE 3 is a section along the lines III—III of FIGURE 1;

FIGURE 4 is a side view partially in longitudinal section of the syringe in which the plunger is shown in position after a sample has been ejected;

FIGURE 5 is a longitudinal section of a modified form of our syringe, showing the plunger withdrawn;

FIGURE 6 is a side elevation partially in section of the syringe shown in FIGURE 5 with the plunger in position after a sample has been ejected; and FIGURE 7 is a section along the lines VII—VII of FIGURE 5.

Referring to the drawings, our syringe comprises a hollow hypodermic needle 8 mounted in one end of a glass tube 9. A metal sleeve 10 surrounds the glass tube and is partially closed at the needle end of the tube 9 leaving an opening 11 through which a plug 12 having a flange 13 is inserted. A similar flanged plug 14 is inserted in the end of the glass tube. The flanged ends of the two plugs 12 and 14 face each other, and each has a central semicircular cavity 15 which together form a spherical cavity to receive a small metal ball 16 mounted on the needle 8. The plugs 12 and 14 are drilled longitudinally and are made of resilient material so that a needle can be inserted from the outer face of the plug 14 and held in place by inserting plug 12 to hold the ball in the spherical cavity.

The end of the tube or sleeve 10 away from the needle 8 has external threads 17, and a barrel 18 with internal threads is threaded over the end of the tube 10. The barrel 18 has internal shoulders 19, and a spacer 20 and gasket 21 are clamped between these shoulders and the end of the tube 10 by turning the barrel 18 on the threads 17.

Within the tube 9 a plunger 22 moves toward and away from the end of the needle 8 to draw in and expel liquid through the needle. The plunger makes a close fit with the inner walls of the tube 9 and is formed of material such as polytetrafluoroethylene which will enable it to slide easily in the tube. The plunger 22 is threaded onto the end of a plunger rod 23 which extends through central openings in the spacer 20 and gasket 21, through the barrel 18, and out beyond the end of the barrel. The outer end of the rod 23 is threaded, and the threaded portion carries at its end a hand knob 24 whereby an operator can move the plunger in the tube 9.

A compression spring 25 surrounds the portion of the plunger rod 23 which is inside the barrel 18. One end of the spring engages a snap ring 26 fitted into a groove in the rod, and the other end of the spring engages a partition 27 which divides the interior of the barrel 18 and has a central opening through which the plunger rod 23 passes. The length of the spring 25 is such that the spring resiliently presses the plunger 22 against the end of the needle 8. As shown in FIGURE 1, if the plunger is moved away from the needle 8 to draw liquid into the syringe, the spring 25 is compressed.

To hold the plunger in a position away from the needle 8 against the force of the spring, a stop 28 is threaded onto the plunger rod 23. The stop has radially extending pins 29 which when the plunger and plunger rod move towards the needle 8 engage the end of the barrel 18. Two diametrically opposed slots 30 formed in the barrel 18 extend from the end of the barrel and parallel to the axis of the barrel. These slots have a width slightly greater than the diameter of the pins 29 so that when the plunger rod 23 is rotated within the barrel 18 to line the pins 29 with the slots 30, the plunger and plunger rod are released and the spring 25 moves them towards the end of the needle 8 within the tube to expel liquid drawn into the tube when the plunger was moved in the opposite direction.

Preferably only a small degree of rotation is used to release the plunger rod and to insure this manner of operation recesses 31 are formed in the end of the barrel 18 on opposite sides of the slots 30 (see FIGURE 2), and after the plunger has been pulled away from the needle to draw liquid into the tube 10, the plunger rod is allowed to move back under the pressure of the spring 25, and, at the same time, the rod is turned so that the pins 29 go into recesses 31 as shown in FIGURE 3. As is also shown in FIGURE 3, only a small rotation of the plunger rod is required to move the pins 29 from the recesses 31 into the slots 30.

The stop is turned on the plunger rod 23 to position it on the rod and thereby determine the amount of fluid which is ejected from the syringe when the plunger 22 moves forwardly against the needle 8. It is held in any desired position by a lock nut 32. To obtain the desired amount of liquid sample from the syringe, the stop 28 is turned to move it toward the hand knob 24 until the plunger 22 is against the end of the needle within the tube and the pins 29 just clear the recesses 31 when the plunger rod 23 is turned to move the pins 29 into the recesses. This is the zero position. The stop 28 is then rotated to move it toward the knob 24 an amount equal to the distance that the plunger 22 should move to eject the desired volume.

In using our syringe an operator fills the syringe in the conventional manner by drawing more liquid or gas than is required into the tube 9 and allows the plunger to return toward the needle until the pins 29 move into the recesses 31 and prevent further inward movement of the plunger. The operator then withdraws the needle from the sample supply and inserts the needle in a serum cap which forms part of the gas chromatographic apparatus in which the sample is to be analyzed. He then turns the plunger rod to align the pins 29 with the slots 30. The spring 25 then moves the plunger 22 inwardly against the end of the needle to eject a sample having the desired volume. So long as the position of the stop 28 on the plunger rod 24 is not disturbed, all samples will have precisely the same volume and will have been injected into the chromatographic apparatus at the same rate.

FIGURES 5 to 7, inclusive, show a modified form of our syringe. This modified form is the same as the syringe shown in FIGURES 1 to 4, inclusive, except that the barrel 18 of the first embodiment is replaced by a barrel 33 which is internally threaded at both ends, one end being threaded to the tube 9 and the other end having threaded within it a second barrel 34. This second barrel has a partition 35 which has a central opening through which the plunger rod 23 passes and which engages one end of the spring 25. The second barrel also has slots 30 and recesses 31 which are the same as the correspondingly numbered slots and recesses in the embodiment shown in FIGURES 1 to 4, inclusive.

The operation of the modified form of our hypodermic syringe is the same as that described with reference to the embodiment shown in FIGURES 1 to 4, inclusive, except that instead of adjusting the stop 28 on the plunger rod 23 to obtain the desired volume of sample, the barrel 34 is turned in the barrel 33 to move it axially with respect to the barrel 33 and the tube 9. The amount that the barrel 34 moves with respect to the barrel 33 determines the distance that the plunger 22 moves in the tube 9 to produce the required volume of sample. To operate this modified syringe, the barrel 34 is first turned to move it toward the tube 9 so that the plunger 22 rests against the end of the needle 8 in the tube 9. The stop 28 is then turned to move it along the plunger rod 23 until the pins 29 just clear the recesses 31 when the plunger rod is turned to move the pins into the recesses. The barrel 34 is then turned in the barrel 33 to move it axially away from the barrel 33 the distance that the plunger 22 must move to eject the required sample of volume. The operation of this modified syringe is then the same as that described with reference to the first form of our syringe.

To enable the operator to adjust the syringe to produce the samples having volumes varying in amount as quickly, easily and accurately as possible, we provide shims 36, one of which is shown in FIGURE 7. These are placed between the barrels 33 and 34 and around the threaded portion of the barrel 34. The barrel 34 is turned to move it away from the barrel 33, a shim is inserted, and then the barrel 34 is turned to bring it up against the shim 36. By using shims of various thicknesses, the syringe can be adjusted to produce samples of correspondingly various volumes. As appears in FIGURE 7, the shims are U-shaped so that they can be slipped around the threaded portion of the barrel 34 without removing that barrel from the barrel 33.

From the foregoing, it is apparent that we have invented a hypodermic syringe which can be used to obtain samples of uniform volume which are ejected from the syringe at a uniform rate. These results can be obtained without prior practice or training in the use of a syringe.

While we have described certain presently preferred embodiments of our invention, it is to be understood that it may be otherwise embodied within the scope of the appended claims.

We claim:
1. A hypodermic syringe comprising,
   A. a hollow glass tube closed at one end,
   B. a hypodermic needle mounted in the closed end of the tube,
   C. a plunger movable within said tube toward and away from said needle,
   D. a metal sleeve surrounding the glass tube,
   E. a first barrel secured to the end of the sleeve away from the needle,
   F. a second barrel concentrically mounted on the first barrel and movable axially with respect to the first barrel toward and away from the needle,
   G. a plunger rod carrying said plunger at one of its ends and extending into said tube, through both said barrels, and beyond the end of the second barrel,
   H. a compression spring surrounding the plunger rod and connected to the rod to resiliently press it and the plunger toward the needle end of the tube,
   I. a handle on the end of the plunger rod which extends beyond the end of the second barrel whereby the plunger rod and plunger may be withdrawn in said tube away from the needle and against the force of said spring, and
   J. means on the second barrel for releasably holding the plunger rod in a position withdrawn from the needle,
   K. axial movement of the second barrel with respect to the first barrel determining the amount of movement of the plunger rod and plunger toward the needle under the force of said spring upon release of said plunger rod holding means.

2. Apparatus for regulating and dispensing fluid samples in predetermined amounts from a syringe having a cylinder, a hypodermic needle mounted in one end of the cylinder, and a plunger slidably mounted within the cylinder, said apparatus comprising,
   A. a first barrel secured to the cylinder at the end of the cylinder removed from the needle,
   B. a second barrel mounted concentrically on at least a portion of the first barrel and movable axially with respect to the first barrel toward and away from the needle,
   C. a plunger rod having one end secured to the plunger and extending through both said barrels and beyond the end of the second barrel,
   D. a compression spring within said barrels and surrounding said rod and connected to the rod to resiliently press it and the plunger toward the needle,
   E. means on the end of the rod which extends from the second barrel for manually withdrawing the plunger and plunger rod in said cylinder away from the needle and against the force of said spring, and
   F. means on the second barrel for releasably holding the plunger rod in a position withdrawn from the needle,
   G. axial movement of the second barrel with respect to the first barrel determining the distance that the plunger moves in the cylinder away from the needle when the plunger rod is withdrawn to a position in which it is held by said plunger rod holding means.

3. A hypodermic syringe comprising,
A. a hollow glass tube closed at one end,
B. a hypodermic needle mounted in the closed end of the tube,
C. a plunger movable within said tube toward and away from said needle,
D. a plunger rod movable within said tube and on one end of which the plunger is mounted,
E. a metal sleeve surrounding the glass tube,
F. a barrel threaded on the end of the sleeve away from the needle,
G. said plunger rod extending through said barrel and beyond the end of the barrel away from said sleeve,
H. a compression spring
   (1) surrounding the plunger rod within the barrel,
   (2) one end of the spring engaging the plunger rod and resiliently urging the plunger rod and plunger toward the needle end of the tube,
I. a stop on the plunger rod extending radially from the rod to engage the end of the barrel as the rod moves toward the needle, and
J. a slot extending inwardly from the end of the barrel and parallel to the axis of the barrel in which the stop can be placed by rotating the plunger rod to permit further movement of the plunger and plunger rod under pressure of the spring,
K. said stop being adjustable along the length of the rod whereby the amount of movement of the plunger and plunger rod upon release of the stop can be adjusted.

References Cited in the file of this patent
UNITED STATES PATENTS

| | | |
|---|---|---|
| 405,100 | Kloppe | June 11, 1889 |
| 727,069 | Bomeisler | May 5, 1903 |
| 2,792,157 | Gilman | May 14, 1957 |
| 2,798,647 | Broadwin | July 9, 1957 |
| 3,075,674 | Hruskoci | Jan. 29, 1963 |
| 3,094,155 | Taramasso et al. | June 18, 1963 |